United States Patent
Narayanan et al.

(10) Patent No.: US 7,808,970 B2
(45) Date of Patent: Oct. 5, 2010

(54) METHOD OF DYNAMICALLY ASSIGNING MOBILITY CONFIGURATION PARAMETERS FOR MOBILE ENTITIES

(75) Inventors: Vidya Narayanan, Schaumburg, IL (US); Narayanan Venkitaraman, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 666 days.

(21) Appl. No.: 11/172,117

(22) Filed: Jun. 30, 2005

(65) Prior Publication Data

US 2007/0002787 A1    Jan. 4, 2007

(51) Int. Cl.
*H04L 12/28* (2006.01)

(52) U.S. Cl. .................. 370/351; 370/310; 370/238; 370/397

(58) Field of Classification Search .................. 370/328, 370/310, 310.2, 313, 238, 230; 455/411, 455/410

See application file for complete search history.

(56) References Cited

U.S. PATENT DOCUMENTS

| | | | | |
|---|---|---|---|---|
| 6,850,532 | B2 * | 2/2005 | Thubert et al. | 370/401 |
| 7,039,035 | B2 * | 5/2006 | Droms et al. | 370/338 |
| 7,167,466 | B2 | 1/2007 | Chowdhury | |
| 7,277,416 | B1 * | 10/2007 | Chang et al. | 370/338 |
| 7,284,057 | B2 | 10/2007 | Kulkarni | |
| 7,305,429 | B2 | 12/2007 | Borella | |
| 7,447,162 | B1 * | 11/2008 | Leung et al. | 370/338 |
| 7,602,735 | B2 * | 10/2009 | Cheon et al. | 370/401 |
| 7,616,597 | B2 * | 11/2009 | Liu et al. | 370/401 |
| 2002/0057657 | A1 * | 5/2002 | La Porta et al. | 370/331 |
| 2002/0061009 | A1 * | 5/2002 | Sorensen | 370/351 |
| 2002/0191576 | A1 * | 12/2002 | Inoue et al. | 370/338 |
| 2003/0225873 | A1 * | 12/2003 | Wade | 709/223 |
| 2004/0203749 | A1 * | 10/2004 | Iyer et al. | 455/432.1 |
| 2004/0228343 | A1 * | 11/2004 | Molteni et al. | 370/392 |
| 2005/0041634 | A1 * | 2/2005 | Aura | 370/351 |
| 2005/0079869 | A1 * | 4/2005 | Khalil et al. | 455/435.1 |
| 2005/0228893 | A1 | 10/2005 | Devarapalli | |
| 2005/0232146 | A1 * | 10/2005 | Lee et al. | 370/225 |
| 2005/0265259 | A1 * | 12/2005 | Thubert et al. | 370/255 |
| 2005/0281251 | A1 * | 12/2005 | Yumoto et al. | 370/352 |
| 2006/0009197 | A1 * | 1/2006 | Chiba et al. | 455/411 |

(Continued)

FOREIGN PATENT DOCUMENTS

EP    1161032 A2    12/2001

(Continued)

OTHER PUBLICATIONS

Chen et al; "Dynamic Home Agent Reassignment in Mobile IP", IEEE Wireless Communication and Networking Conference (WCNC) Mar. 2002.

(Continued)

*Primary Examiner*—Huy Phan
(74) *Attorney, Agent, or Firm*—Valerie M. Davis

(57) ABSTRACT

A method and system of enabling dynamic configuration of mobility configuration parameters for a mobile entity (105) by a mobility configuration agent (120) may be implemented, wherein the assigned mobility configuration parameters for the mobile entity are based on mobility configuration parameters corresponding to a group to which the mobile entity (120) belongs. An SLP directory (445) may be used to allocate an optimal home agent to the mobile entity.

17 Claims, 4 Drawing Sheets

U.S. PATENT DOCUMENTS

| | | | | |
|---|---|---|---|---|
| 2006/0029014 A1* | 2/2006 | Maturi | .................. | 370/328 |
| 2006/0083249 A1* | 4/2006 | Bhatia et al. | .................. | 370/400 |
| 2006/0104247 A1* | 5/2006 | Dommety et al. | .................. | 370/338 |
| 2006/0190570 A1* | 8/2006 | Booth et al. | .................. | 709/220 |
| 2006/0285525 A1* | 12/2006 | Sastry | .................. | 370/338 |

FOREIGN PATENT DOCUMENTS

WO   WO2003096650 A1   11/2003
WO   WO2004004281 A1   1/2004

OTHER PUBLICATIONS

PCT International Search Report Dated Mar. 19, 2008.
GB Office Action Dated Apr. 7, 2009.
Korean Office Action Dated Feb. 5, 2010.

* cited by examiner

METHOD OF DYNAMICALLY ASSIGNING MOBILITY CONFIGURATION PARAMETERS FOR MOBILE ENTITIES

FIELD OF THE INVENTION

The present invention relates to a system and method of dynamically configuring a mobile entity in a wireless communications network and more specifically to enabling a given grouping of nodes to be configured with configuration parameters that are mutually consistent.

BACKGROUND OF THE INVENTION

Mobile Internet Protocol (also referred to herein as Mobile IP or MIP) is a solution for seamless mobility on a network such as, for instance, the global Internet or a private network, that is scalable, robust and secure, and that allows mobile entities such as mobile devices or "mobile nodes" that may be, for instance, radios, phones, laptops, PDAs, etc., to maintain ongoing communications while changing their point of attachment to the network. Specifically, each mobile node is always identified by its home address (regardless of its current point of attachment to the network), which provides information about its point of attachment to a home network. However, when the mobile node is connected to the network outside of its home network, for example, when visiting a foreign network or a foreign domain, the mobile node is also associated with a care-of address that provides information about its current point of attachment.

Mobile IP provides for a registration process for registering the care-of address with a network entity called a home agent ("HA") whose point of attachment, for example, its IP address, is in the mobile node's home network. The home agent is a router on the mobile node's home network that tunnels datagrams (also known in the art as data packets) for delivery to the mobile node when it is away from home, and maintains current location information for the mobile node. Registration is what enables the home agent to send the datagrams destined for the mobile node through a tunnel to the care-of address. After arriving at the end of the tunnel, each datagram is then delivered to the mobile node. Registration may be performed via a network entity called a foreign agent ("FA") whose point of attachment is in the visited network and whose IP address is the care-of address for the mobile node. The foreign agent is a router on the mobile node's visited network that provides routing services to the mobile node when registered with the foreign agent.

A mobile network is an IP subnet that changes its point of attachment to the infrastructure. One or more mobile routers are usually present in the mobile network to serve as a gateway for the nodes on the mobile network. The mobile router is the entity that changes its IP point of attachment—it hides the mobility from the mobile network. Hence, the nodes on the mobile network are unaware of the changes in points of attachment of the mobile router. Different types of nodes, termed as 'mobile network nodes (MNNs)' may be present on the mobile network, including fixed nodes that do not roam out of the mobile network, referred to as 'local fixed nodes (LFNs)' and mobile nodes that may roam in and out of the mobile network. Further, two types of mobile nodes may attach to the mobile network—nodes whose "home" is on the mobile network (i.e., the home addresses of these nodes come from the IP subnet space of the mobile network), termed as 'home mobile nodes (HMNs)' and nodes that are visiting the mobile network (i.e., nodes whose "home' is not on the mobile network), termed as 'visiting mobile nodes (VMNs)'.

The term Mobile Node refers to either a HMN or a VMN in generic terms. The term Mobile Entity refers to one of a mobile router or a mobile node.

Accordingly, a mobile entity such as a mobile node or a mobile router should typically be dynamically configured with one or more mobility configuration parameters upon power-up, for example by being assigned or allocated a home agent address, an Internet Protocol (IP) home address, security associations, a Virtual Private Network (VPN) server, etc. Further, there is often a need for such mobility configuration parameter assignments being coordinated among different mobile entities. For example, a HMN may need to be assigned the same home agent address as its home mobile router for optimal operation. As another example, two mobile nodes may need to be assigned the same multicast security association parameters to be able to participate in a multicast session. One way of configuring a mobile entity is through static assignments. However, static assignments are cumbersome and do not allow for load balancing and dynamic failure recovery.

Another way of configuring a mobile device is through dynamic assignments. Typically, dynamic assignments of one or more mobility configuration parameters such as home addresses is desirable because it preserves IP address space since it eliminates the need to have pre-allocated IP addresses for all mobile entities in the system and it removes the complex configurations involved in static assignments. However, the known means for accomplishing dynamic assignments of mobility configuration parameters suffers from some shortcomings.

For example, one method of dynamic assignment of home agents and home IP addresses essentially requires two roundtrip Mobile Internet Protocol (MIP) registrations when a requested home agent is different from an assigned home agent, and thus requires separate mobile node—home agent security associations for both home agent entities. Moreover, if the security associations are configured to be dynamically set up, this may result in increased delays. This method is only applicable to mobile nodes and fails to address dynamic assignments in mobile networks. More particularly, the method does not provide a method of coordinating assignments of such parameters between different groups of mobile entities—such as coordinating assignment of home agent addresses between mobile routers and nodes serviced by the mobile routers.

Another method of dynamic assignments of mobility configuration parameters, Dynamic Host Configuration Protocol ("DHCP"), does not work when the mobile device is powering up away from the home domain. The DHCP server, in this case, will not know the appropriate parameters corresponding to the mobile device's home domain. Thus, this is not a viable alternative for nodes roaming beyond the home domain. Also, this method does not provide a method of coordinating assignments of such parameters between different groups of mobile entities—such as coordinating assignment of home agent addresses between mobile routers and nodes serviced by the mobile routers. Hence, there is a need to address the above issues and provide a method for dynamic allocation of mobility configuration parameters with the ability to group entities and provide mutually consistent parameters.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE INVENTION

Figure 1:
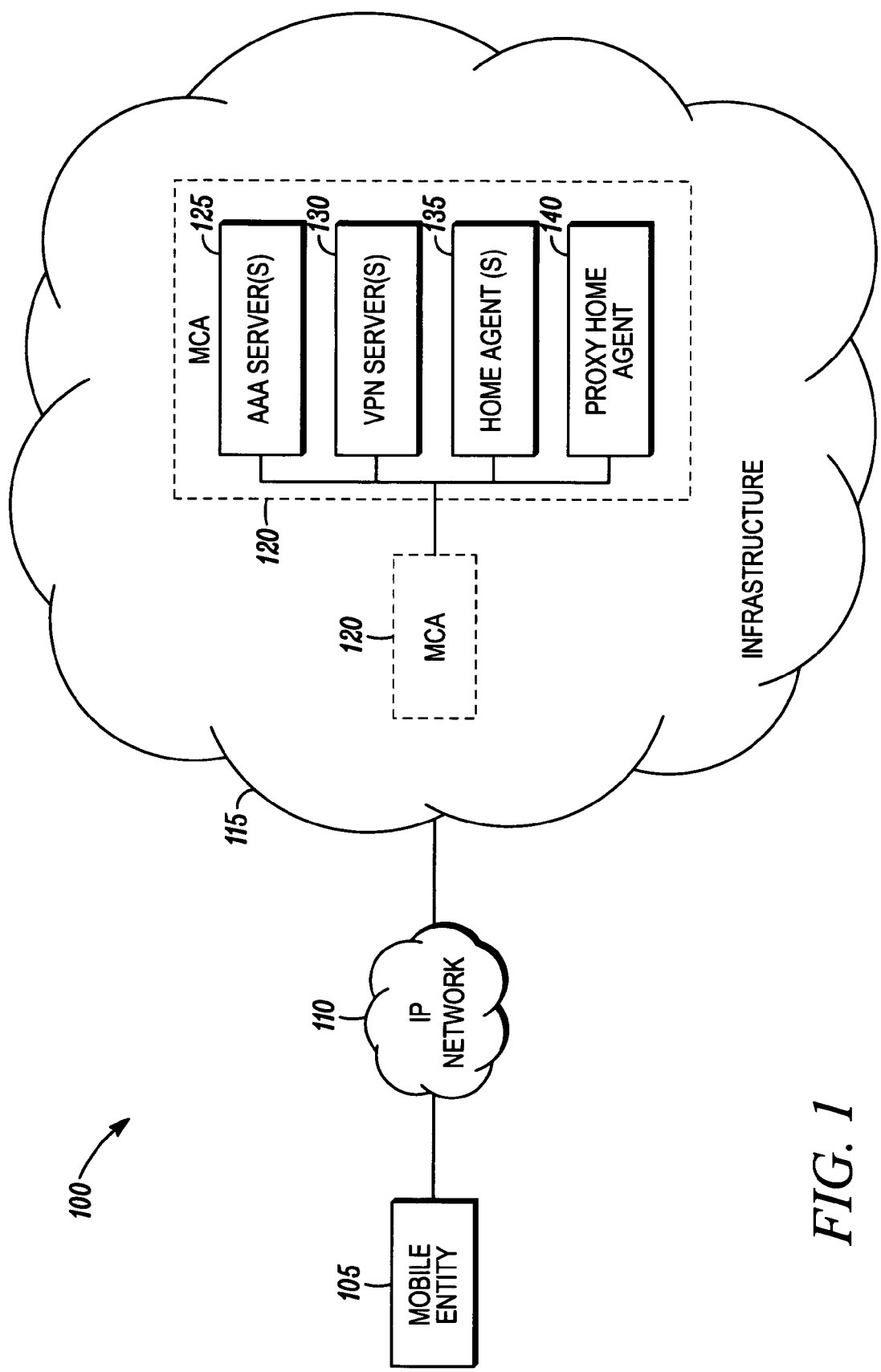
FIG. 1 illustrates a block diagram of a network 100 in accordance with embodiments of the present invention.

Before describing in detail embodiments that are in accordance with the present invention, it should be observed that the embodiments reside primarily in combinations of method steps and apparatus components related to dynamically assigning mobility configuration parameters for mobile entities. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments. In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. It will be appreciated that embodiments of the invention described herein may be comprised of one or more conventional processors and unique stored program instructions that control the one or more processors to implement, in conjunction with certain non-processor circuits, some, most, or all of the functions of the methods and apparatus for dynamically assigning mobility configuration parameters for mobile entities described herein. The non-processor circuits may include, but are not limited to, a radio receiver, a radio transmitter, signal drivers, clock circuits, power source circuits, and user input devices. As such, these functions may be interpreted as steps of a method to dynamically assign mobility configuration parameters for mobile entities described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Turning now to FIG. 1, a block diagram of a network in accordance with embodiments of the present invention is shown and generally indicated at 100. Network 100 may be a wireless network implementing standard Mobile Internet Protocol (for example, in accordance with Internet Engineering Task Force Request for Comments 3344, i.e. MIPv4). Network 100 includes a mobile entity 105 that may be, for instance, a mobile node or a mobile router. If a mobile node, then the mobile node may be a home mobile node or a visiting mobile node, and is typically a device such as a cell phone, PDA, or laptop having suitable hardware and software that enables and facilitates network roaming capabilities.

Network 100 further comprises a mobility configuration agent 120 comprising suitable hardware (such as a processing device coupled to memory) and software for facilitating the assignment or allocation of one or more mobility configuration parameters to one or more mobile entities in accordance with embodiments of the present invention. Mobility Configuration Agent 120 typically resides in a communication infrastructure 115 that may include, for instance, servers, routers, etc., as is well known in the arts. The mobile entity 105 communicates with the MCA 120 via an IP network 110, which may be, for instance, a Local Area Network, a Wide Area Network, the Internet, etc. The mobility configuration agent 120 may in one exemplary embodiment be implemented as a separate entity such as a server or a router that is configured in accordance with embodiments of the present invention. In one exemplary embodiment, the mobility configuration agent 120 may be a logical entity such as software stored in a memory and executed by a processor that is located, for instance, in a home agent 135. It should be further understood by those if ordinary skill in the art that in other embodiments the functionality of the mobility configuration agent 120 may be collocated with another device such as for instance an Authentication, Authorization and Accounting (AAA) Server 125, a VPN server 130 or a Proxy Home Agent (PHA) 140 and that, moreover, any agent that is capable of dynamically allocating one or more mobility configuration parameters to mobile entity 105 can serve as a mobility configuration agent 120, and all such servers, applications and agents are within the scope of the present invention. Also, the functionality of the MCA 120 may be distributed among several entities, such as on a home agent, VPN server, PHA and an AAA server. This allows different mobility configuration parameters to be assigned by different entities.

Network 100 can comprise a group or pool of home agents, e.g. 135, that may be allocated to mobile entity 105 using a mobility configuration agent 120. In exemplary network 100, home agents are directly connected to the same sub-network. Thus, there are no hops (e.g., routers) separating the mobility configuration agent 120 from the home agents. Alternatively, in accordance with another embodiment there may be one or more hops separating the agent 120 from one or more of the home agents. Moreover, network 100 shows a single mobile entity 105 and several alternatives for a single mobility configuration agent 120. However, it should be appreciated by those of ordinary skill in the art that a typical network 100 may have many more such elements. Also, other elements such as VPN servers 130 may be present one or more hops away from agent 120 in the infrastructure.

When a mobile node (e.g., mobile entity 105) powers up in a home network, the mobile node is part of a network segment, e.g., a sub-network (or "subnet"), that is typically connected to the Internet via a router, for example a mobile router. Thus, all Internet traffic directed to the mobile node is routed via the mobile router. Each mobile node within the subnet is typically allocated a unique home IP address corresponding to the subnet. In addition to the unique home address, each mobile entity 105 typically also has a unique identifier such as a network access identifier (NAI), a layer 2 (L2) address, a layer 3 (L3) address or other such identifier that identifies the mobile entity, wherein layer 2 and layer 3 are understood to be, respectively, the data link and network layers of the well known Open System Interconnection (OSI) model. For example, the NAI for a mobile router can be mr1@cen.com and the NAI for a home mobile node associated with the mobile router (also commonly referred to in the art as being "behind" the mobile router) may be hmn-mr1@cen.com, indicating that MR1 is the home mobile router associated with the mobile node. While such a convention used in creating NAIs for related mobile entities (such as a mobile router and its HMN) is one method of identifying the related mobile entities, other methods may be used as well. As an example, the mobility configuration agent can be configured with many groups, each of which is a set of NAIs that correspond to related groups.

When the mobile node travels to a different network segment and is connected to the Internet via another router (e.g., a mobile router), the mobile node's home IP address doesn't have to be changed each time it connects from a different location. The home agent allocated to the mobile node maintains information about the mobile node's current location using a care-of address allocated to the mobile node in the different network. The home agent tunnels all Internet traffic directed towards the mobile node to the mobile node using the care-of-address and hence other mobile nodes do not need to be aware of the different IP addresses assigned to or associated with the mobile node as it travels.

In the event of a static allocation for home agents, if the distance between the visited network and the home network of the mobile node is large, the signaling delay for these registrations may be long and hence the Internet traffic will need to be tunneled long distances when the mobile node is anchored to the distant home agent. Dynamic home agent allocation provides for several advantages. When a Mobile IP session initiates, if the mobile node can be assigned a home agent that is close to the mobile node, it can drastically reduce the latency between the home agent and mobile node.

Pursuant to an embodiment of the present invention, a mobility configuration parameter such as a home agent address, a VPN server address or a security key that is shared by a group of mobile entities may be dynamically allocated to mobile entity 105, for instance, based on the NAI described above. Accordingly, mobile entity 105 first sends a request message, for example, a registration request to the mobility configuration agent (e.g. a PHA) 140. As stated previously, the mobility configuration agent 120 is an agent either on a separate server or executed on a server that is responsible for allocating mobility configuration parameters such as HA's to a mobile entity 105 such as an AAA server 125, a VPN server 130 or a proxy home agent server 140. As per one embodiment, the mobility configuration agent 120 can also be a logical entity residing on one of the pool of home agents 135 available within the network. Those skilled in the art shall appreciate that any server capable of dynamically allocating one or more mobility configuration parameters to a mobile entity 105 can serve as a mobility configuration agent 120, and all such servers, applications and agents are within the scope of the present invention. FIG. 1 depicts exemplary configurations pursuant to an embodiment of the invention. As per the first embodiment, the MCA receives the registration request from the mobile entity and allocates a home agent for the mobile entity 105. The allocated home agent is termed the Assigned Home Agent (AHA). In this case illustrated, one of the home agents shall be allocated as the AHA based on the group(s) to which the mobile entity belongs. The determination of the group and the process of selecting the configuration parameters are further explained using FIG. 2 and FIG. 3.

The MCA 120, upon allocating an AHA, for example HA 135, for the mobile entity 105 based on the NAI, forwards the registration request to the AHA. Those skilled in the art shall appreciate that this step can be eliminated if the MCA 120 is co-located with the AHA. The MCA 120 contains intelligence to allocate an optimal AHA from the pool of available home agents for the mobile entity 105 based on certain predetermined parameters. The AHA, on receiving the registration request, processes the request in accordance with the mobile IP standard. The AHA may in turn have MCA 120 function which will then dynamically allocate other mobility configuration parameters such as a Home Address (HoA) and/or security associations to the mobile entity 105 based on group to which the mobile entity belongs and formulate a registration reply directly to the ME 105. During this process, the MCA 120 may be surpassed and the AHA communicates directly with the mobile entity 105 and completes the registration request. However, the MCA 120 resident in the AHA is responsible for updating the MCA 120 with any changes in the registration state for the mobile entity 105. For example, if the registration fails, the MCA 120 must be made aware of such failure so that the MCA may allocate a different AHA for the mobile entity 105 based on predetermined parameters.

There are different ways of synchronizing the MCA 120 and AHA. In one embodiment, the AHA explicitly sends an update to the MCA 120 and then may send periodic updates for any changes. In another embodiment, the registration reply that is sent from the AHA to the mobile entity 105, once the mobile entity 105 is registered, is routed via the MCA 120 to the mobile entity. This enables the MCA 120 and AHA to have consistent views. Pursuant to another embodiment, the AHA can send a periodic dump of all current registrations and failures to the MCA 120.

It must be noted that although the embodiment explains the function of MCA in the context of allocation of home agent, home address and a Security Association to the mobile entity 105, other mobility configuration parameters such as multicast groups, multicast security associations, etc. can also be allocated or assigned to the mobile entity by the mobility configuration agent 120.

In another embodiment, the PHA, the AHA and the AAA server may all have some component or the other of the MCA and participate in allocating or assigning different mobility configuration parameters for the mobile entity. For example, where an Authentication, Authorization and Accounting (AAA) Server 125 is involved in the process of dynamically allocating a HA and HoA to a mobile entity 105. The request message can be forwarded to the AAA server 125 from a PHA 140. The AAA server 125 is generally hardwired to the network and comprises the authentication credentials for mobile nodes. Those skilled in the art shall appreciate that the AAA server 125 can be connected to several other AAA's and can authenticate the mobile entity in conjunction with the other AAA's. The AAA server 125 is responsible for allocating an AHA and a HoA for the mobile entity 105. The AHA then fulfills the request with a response message with the mobile entity 105.

The advantage of this embodiment is that the registration request is sent to the AHA only after the AAA server 125 successfully authenticates the mobile entity 105. This provides an additional level of security where the PHA 140 may be located in the Demilitarized Zone (DMZ), while the actual AHA may be located in the Customer Enterprise Network (CEN). This enables only authenticated messages to be sent to the AHA.

Figure 2:
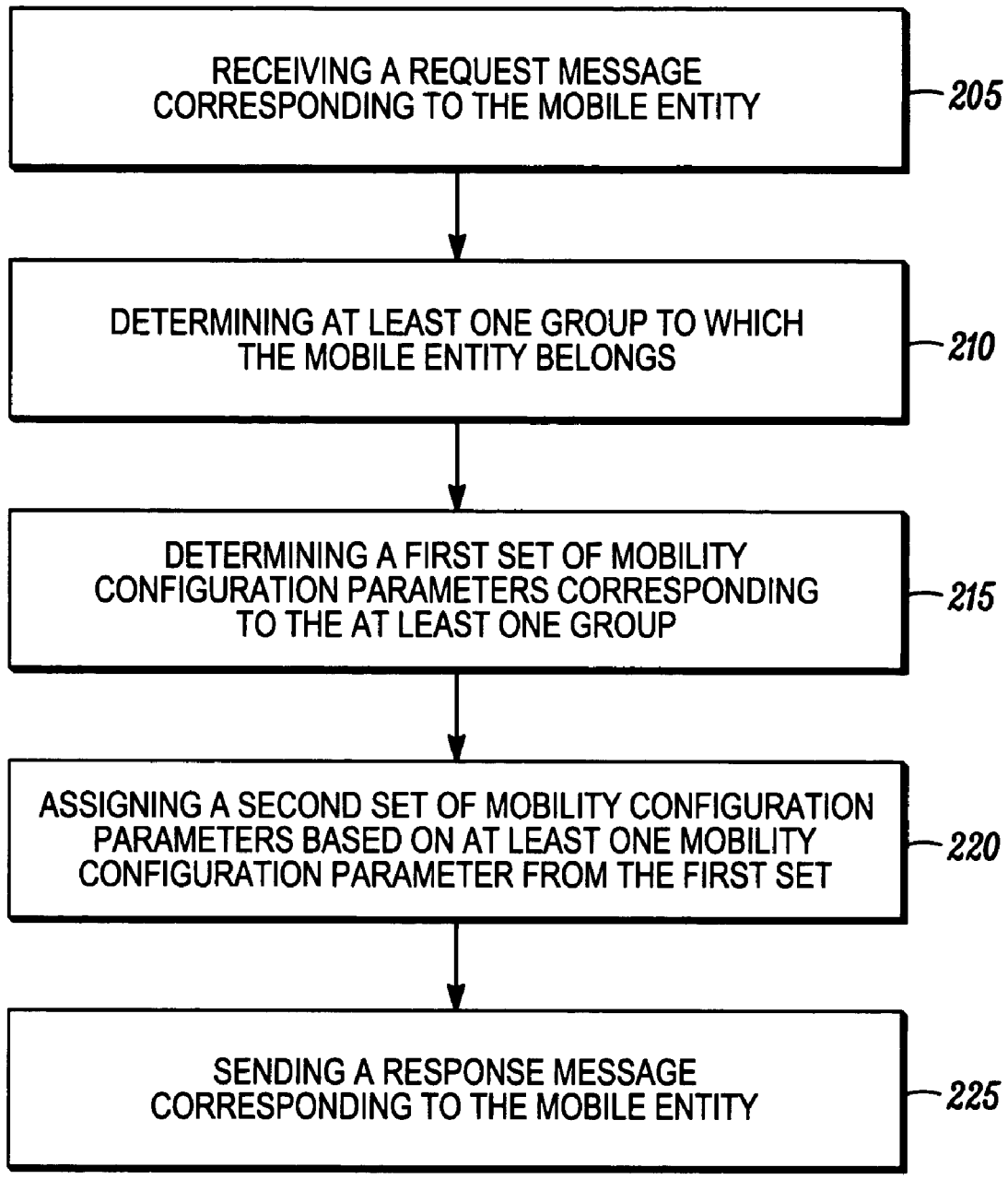
FIG. 2 illustrates a flow diagram depicting an allocation of mobility configuration parameters to a mobile entity in accordance with embodiments of the present invention.

Turning now to FIG. 2, a flow diagram depicting an allocation of mobility configuration parameters to a mobile entity pursuant to embodiments of the present invention is generally depicted. A mobility configuration agent receives a request message from a mobile entity, including a mobile node or a mobile router, at step 205. The request message can be one of a Mobile Internet Protocol registration request, an Internet Key exchange message, an Extensible Authentication Protocol (EAP) message, an AAA message or any other message triggering assignment of mobility configuration parameters for the mobile entity. The mobility configuration agent can be a PHA, HA, VPN Server or an AAA server or any such server, agent or application that can handle requests of a mobile entity and allocate an optimal home agent (as disclosed in FIG. 1). In one embodiment, the MCA can be discovered using DHCP, DNS, static configuration or other such equivalent methods. As stated above, the MCA can be a separate server or an application being executed on a home agent and is responsible for allocating an optimal AHA and potentially other mobility configuration parameters for the mobile entity. Alternatively, the mobility configuration agent can also be an AAA server that receives the request and is responsible for allocating the mobility configuration parameters for the mobile entity. Also, the MCA may be a distributed function residing in two or more of such entities. For instance, the PHA, the AHA and the AAA server may all have some component or the other of the MCA and participate in allocating or assigning different mobility configuration parameters for the mobile entity.

Once the mobility configuration agent receives the request, the request is examined to determine at least one group to which the mobile entity belongs, step 210. It may be required to decapsulate the message first. According to one embodiment of this invention, the decapsulated request comprises of an IP packet with the mobile entity's care-of-address as a source address and the destination address set to ALL-ZERO-ONE_ADDRESS, for example, 0.0.0.0 or 255.255.255.255, originally encapsulated by the mobile entity. Where a part of the mobility configuration agent functionality is present in the PHA, the PHA is responsible for decapsulating the packet to determine a first set of mobility configuration parameters based on the group the mobile entity belongs to, step 215. In one embodiment, the group is determined based on the network sub-domain of a mobile router. The mobile router sub-domain may be defined as mobile subnets served by the mobile router. The request message received may contain an identifier corresponding to the mobile entity. The identifier can be one of a network access identifier (NAI), L2 address, an L3 address or any such identifier, that is used to determine the group to which the mobile entity belongs, such as the network sub-domain corresponding to the mobile entity. The de-capsulated request may, for example, be forwarded to an AHA as a response message corresponding to the mobile entity.

The MCA allocates mobility configuration parameters (e.g., an appropriate home agent from the list of possible home agents) based on the identified group(s). The mobility configuration agent, using the identifier of the mobile entity, extracts the group(s) (e.g., the mobile router sub-domain) associated with the mobile entity. Before allocating any mobility configuration parameters to the mobile entity, the MCA may check to see if any mobility configuration parameters have been allocated to the one or more groups to which the mobile entity belongs. If not, the MCA may allocate a first set of mobility configuration parameters (such as an AHA) to one or more of the groups to which the mobile entity belongs. For instance, before allocating the home agent as the AHA for the mobile entity, the MCA may perform a check to determine if an AHA has already been allocated to the one or more groups to which the mobile entity belongs, and allocate the same AHA to the mobile entity if the AHA had already been allocated. If the AHA has not yet been allocated, then an AHA may be allocated to at least one group to which the mobile entity belongs. Another example is when the MCA is allocating a home address to a mobile entity, which is a HMN on a mobile network. The MCA may check to see if a mobile subnet corresponding to the group, in this case, the mobile router sub-domain, to which the mobile entity belongs, has already been allocated. If yes, the home address for the mobile entity may be allocated from that subnet. If not, a subnet may be allocated to that mobile router sub-domain as part of a first set of mobility configuration parameters assigned to the group.

The PHA assigns a second set of mobility configuration parameters to the mobile entity based on the at least one mobile configuration parameter from the first set, step 220. The second set of mobility configuration parameters may comprise at least one of a home agent address, a home Internet Protocol address, a security association, a multicast security association, and a multicast group. Other parameters such as any QoS classification, VPN server, etc. may also be part of the second set of mobility configuration parameters assigned. Each home agent providing home agent services to nodes within the network may register itself with an SLP Directory. The MCA may send a response to the mobile entity, providing the mobility configuration parameters assigned to the mobile entity, step 225. The response message can include at least one mobility configuration parameter, for example, a home agent address corresponding to an assigned home agent, from the second set of mobility configuration parameters.

In the case where the MCA allocated mobility configuration parameters, such as the HA address, the MCA may need to be informed of the status (e.g., success or failure) of the response corresponding to the request message, e.g., a response message, and hence the AHA may provide an update or several updates to the MCA at periodic intervals on the registration. There are several ways that the AHA sends an update to the MCA. In one embodiment, the AHA explicitly sends an update to the MCA and then may send periodic updates for any changes. In another embodiment, the registration reply that is sent from the AHA to the mobile entity, once the mobile entity is registered, is routed via the MCA to the mobile entity. This enables the MCA and AHA to have consistent views. However, this may for example be performed only during the first registration request/registration reply pair, as repeated routing via the MCA would considerably delay the handoff if the MCA were not topologically in the path of the messages. Pursuant to another embodiment, the AHA can send a periodic dump of all current registrations and failures to the MCA. This may work well if the MCA and AHA share a directly connected interface through which they can communicate. The mobility configuration agent may, based upon the identified status (e.g., success) of the response message, maintain a map between a mobile router sub-domain and at least one of the assigned mobility configuration parameters (such as an assigned home agent) allocated to the mobile router sub-domain for future allocations.

Pursuant to another embodiment (for example by reference to FIG. 1) the mobility configuration agent can comprise a PHA, the AHA and the AAA server and all may have some component or the other of the MCA and participate in allocating or assigning different mobility configuration parameters for the mobile entity. The PHA can forward the request message received from the mobile entity to the AAA server. The AAA server can then be responsible for assigning an AHA to the mobile entity following a process similar to the one disclosed under FIG. 2. The AAA server may determine the at least one group to which the mobile entity belongs, step 210. The AAA server may determine a first set of mobility configuration parameters corresponding to at least one group to which the mobile entity belongs, step 215. The AAA server re-encapsulates the request as the second request in accordance with the standard mobile IP for allocating an AHA from the home agents available. A second set of mobility configuration parameters are assigned to the mobile entity based on at least one mobility configuration parameter from the first set of mobility configuration parameters, step 220. Hence, as per this embodiment, the AAA server serves as the mobility configuration agent the optimal AHA for the mobile entity. The AHA sends a response to the mobile entity with the configuration.

Figure 3:
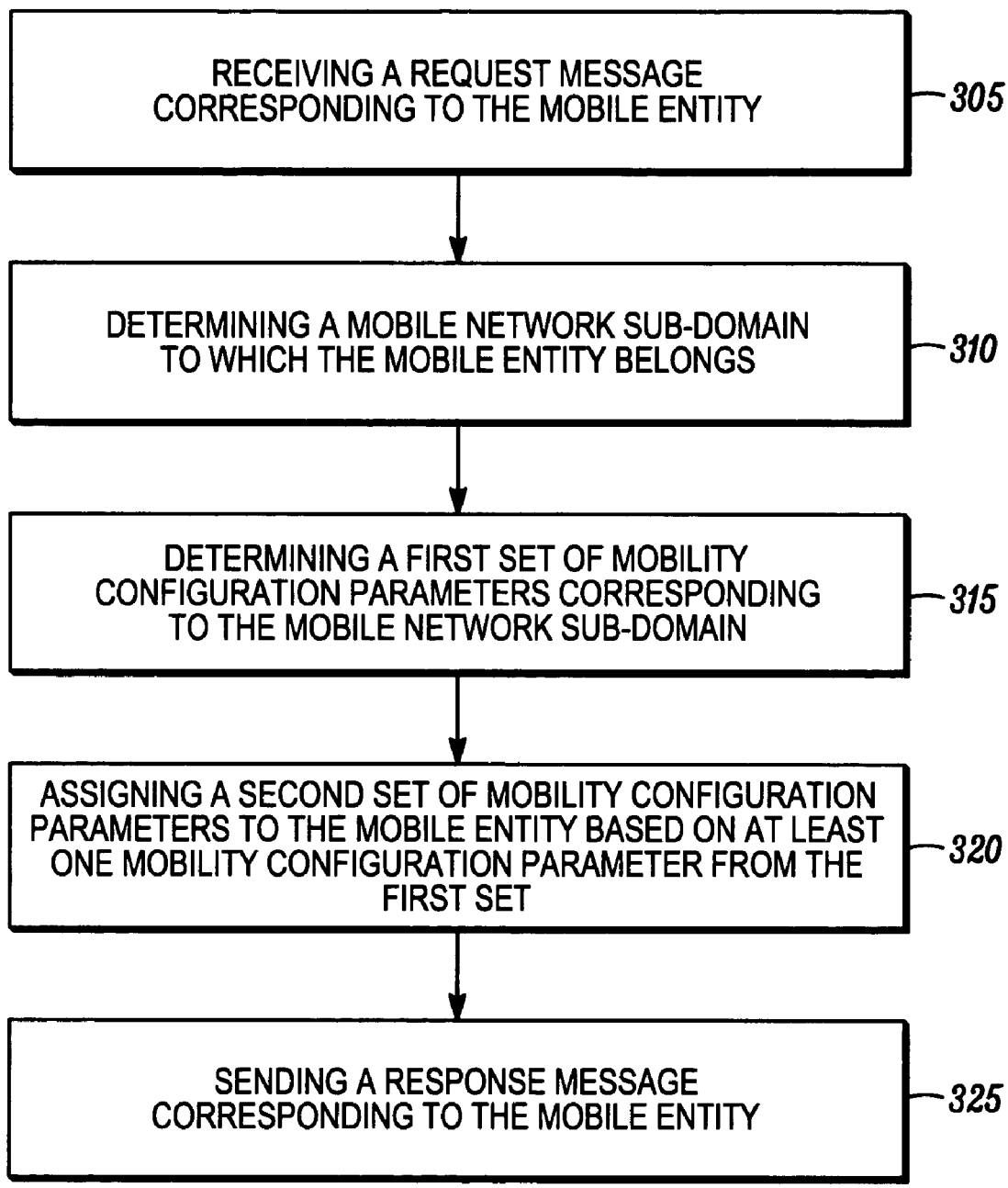
FIG. 3 illustrates a flow diagram depicting an allocation of mobility configuration parameters to a mobile entity in accordance with embodiments of the present invention.

Turning now to FIG. 3, a flow diagram depicting an allocation of mobility configuration parameters to a mobile entity in accordance with embodiments of the present invention is generally depicted. A mobility configuration agent receives a request message from a mobile entity, including a mobile node or a mobile router, at step 305. The request message can be one of a Mobile Internet Protocol registration request, an Internet Key exchange message, an Extensible Authentication Protocol (EAP) message, an AAA message or any other message triggering assignment of mobility configuration parameters for the mobile entity. The mobility configuration agent can be a PHA, HA, VPN Server or an AAA server or any such server, agent or application that can handle requests of a mobile entity and allocate an optimal home agent (as disclosed in FIG. 1). As stated above, the MCA can be a separate server or an application being executed on a home agent and is responsible for allocating an optimal AHA and potentially other mobility configuration parameters for the mobile entity. Alternatively, the mobility configuration agent can also be an AAA server that receives the request and is responsible for allocating the mobility configuration parameters for the mobile entity. Also, the MCA may be a distributed function residing in two or more of such entities. For instance, the PHA, the AHA and the AAA server may all have some component or the other of the MCA and participate in allocating or assigning different mobility configuration parameters for the mobile entity.

Once the mobility configuration agent receives the request, the request is examined to determine a mobile network sub-domain to which the mobile entity belongs, step 310. The mobile router sub-domain may be defined as mobile subnets served by the mobile router. The request message received may contain an identifier corresponding to the mobile entity. The identifier can be one of a network access identifier (NAI), L2 address, an L3 address or any such identifier that is used to determine the mobile network sub-domain to which the mobile entity belongs. For example, the NAI for a mobile router can be mr1@cen.com and the NAI for a home mobile node associated with the mobile router may be hmn-mr1@cen.com, indicating that MR1 is the mobile router associated with the home mobile node.

It may be required to decapsulate the message first to determine the mobile router sub-domain. According to one embodiment of this invention, the decapsulated request may comprise of an IP packet with the mobile entity's care-of-address as a source address and the destination address set to ALL-ZERO-ONE_ADDRESS, for example, 0.0.0.0 or 255.255.255.255, originally encapsulated by the mobile entity. Where a part of the mobility configuration agent functionality is present in the PHA, the PHA may be responsible for decapsulating the packet to determine a first set of mobility configuration parameters based on the mobile network sub-domain to which the mobile entity belongs, step 315.

The MCA allocates mobility configuration parameters (e.g., an appropriate home agent from the list of possible home agents) based on the identified group(s). The mobility configuration agent, using the identifier of the mobile entity, extracts the mobile router sub-domain associated with the mobile entity. Before allocating any mobility configuration parameters to the mobile entity, the MCA may check to see if any mobility configuration parameters have been allocated to the mobile network sub-domain to which the mobile entity belongs. If not, the MCA may allocate a first set of mobility configuration parameters (such as an AHA) to the mobile network sub-domain to which the mobile entity belongs. Hence, mobile entities within the same mobile network sub-domain may be allocated the same AHA subject to load-balancing, proximity and other such parameters. Another example is when the MCA is allocating a home address to a mobile entity, which is a HMN on a mobile network. The MCA may check to see if a mobile subnet corresponding to the mobile network sub-domain to which the mobile entity belongs, has already been allocated. If yes, the home address for the mobile entity may be allocated from that subnet. If not, a subnet is first allocated to that mobile router sub-domain as part of the first set of mobility configuration parameters assigned to the group.

The MCA assigns a second set of mobility configuration parameters to the mobile entity based on the at least one mobile configuration parameter from the first set, step 320. The second set of mobility configuration parameters comprises at least one of a home agent address, a home Internet Protocol address, a security association, a multicast security association, and a multicast group. Other parameters such as any QoS classification, VPN server, etc. may also be part of the second set of mobility configuration parameters assigned. Each home agent providing home agent services to nodes within the network may register itself with an SLP Directory. The MCA may then send a response to the mobile entity, providing the mobility configuration parameters assigned to the mobile entity, step 325. The response message can include at least one mobility configuration parameter, for example, a home agent address corresponding to an assigned home agent, from the second set of mobility configuration parameters.

Where the mobile entity powers up before the mobile router associated with the mobile node (in the visited network), the AHA will not have any mobile subnet prefix allocated to that mobile router at that time. The first set of mobility configuration parameters comprises a subnet corresponding to the mobile network sub-domain. In this case, the AHA can allocate a subnet and allocate an appropriate HoA for this mobile entity on that subnet. The allocated mobile subnet may be stored by the AHA and given to the mobile router when it powers up. In other words, according to the invention, the AHA allocates a mobile subnet when it receives the registration request from any mobile entity belonging to the mobile router sub-domain. Using the same example as before, if mr1@cen.com and hmn-mr1@cen.com denote the mobile router and the home mobile node associated with the mobile router respectively, the AHA will allocate the mobile subnet when it processes the request message received from the mobile entity in the mobile router sub-domain, as long as it has no prior state for that mobile network sub-domain. This means that if the registration request received was from the home mobile node, the mobile subnet for the mobile router associated with the home mobile node will be allocated and stored in the AHA, even though the response message to the home mobile node includes only the home address for the home mobile node. When it receives a registration request from the mobile router once it powers up at a later point, it will include the already allocated mobile subnet while fulfilling the request message by sending a response message to the mobile entity.

In the case where the MCA allocated mobility configuration parameters, such as the HA address, the MCA may need to be informed of the status (e.g., success or failure) of the response corresponding to the request message, e.g. a response message, and hence the AHA may provide an update or several updates to the MCA at periodic intervals on the registration. There are several ways that the AHA sends an update to the MCA. In one embodiment, the AHA explicitly sends an update to the MCA and then may send periodic updates for any changes. In another embodiment, the registration reply that is sent from the AHA to the mobile entity, once the mobile entity is registered, is routed via the MCA to the mobile entity. This enables the MCA and AHA to have consistent views. However, this may for example be performed only during the first registration request/registration reply pair, as repeated routing via the MCA would considerably delay the handoff if the MCA were not topologically in the path of the messages. Pursuant to another embodiment, the AHA can send a periodic dump of all current registrations and failures to the MCA. This may work well if the MCA and AHA share a directly connected interface through which they can communicate. The mobility configuration agent may, based upon the identified status (e.g. success) of the response message, maintain a map between a mobile router sub-domain and at least one of the assigned mobility configuration parameters (such as an assigned home agent) allocated to the mobile router sub-domain for future allocations.

Figure 4:
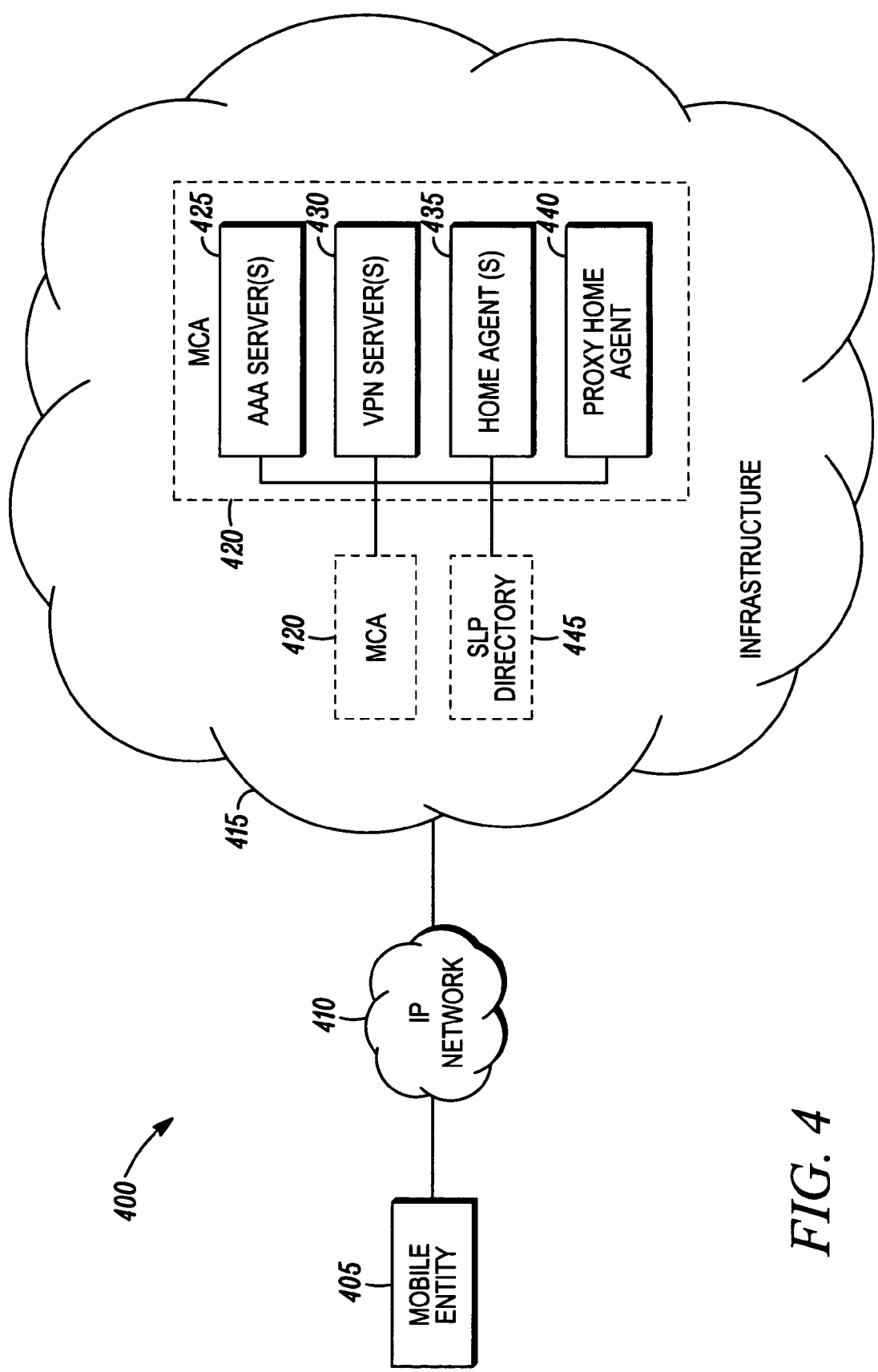
FIG. 4 illustrates a block diagram of a network 400 in accordance with embodiments of the present invention.

FIG. 4 illustrates a block diagram of a network 400 in accordance with embodiments of the present invention. Network 400 may be a wireless network implementing standard Mobile Internet Protocol (for example, in accordance with Internet Engineering Task Force Request for Comments 3344, i.e. MIPv4). Network 400 includes a mobile entity 405 that may be, for instance, a mobile node or a mobile router. If a mobile node, then the mobile node may be a home mobile node or a visiting mobile node, and is typically a device such as a cell phone, PDA, or laptop having suitable hardware and software that enables and facilitates network roaming capabilities.

Network 400 further comprises a mobility configuration agent 420 comprising suitable hardware (such as a processing device coupled to memory) and software for facilitating the assignment or allocation of one or more mobility configuration parameters to one or more mobile entities in accordance with embodiments of the present invention. Mobility Configuration Agent 420 typically resides in an infrastructure 415. The mobile entity 405 communicates with the MCA 420 via an IP network 410. The mobility configuration agent 420 may in one exemplary embodiment be implemented as a separate entity such as a server or a router that is configured in accordance with embodiments of the present invention. In one exemplary embodiment, the mobility configuration agent 420 may be a logical entity such as software stored in on a memory and executed by a processor that is located, for instance, in a home agent 435. It should be further understood by those if ordinary skill in the art that in other embodiments the functionality of the mobility configuration agent 420 may be collocated with another device such as for instance and Authentication, Authorization and Accounting (AAA) Server 425 or a VPN server 430 or a Proxy Home Agent (PHA) 440 and that, moreover, any agent that is capable of dynamically allocating one or more mobility configuration parameters to mobile entity 405 can serve as a mobility configuration agent 420, and all such servers, applications and agents are within the scope of the present invention. Also, the functionality of the MCA 420 may be distributed among several entities, such as on a home agent, VPN server, PHA and an AAA server 425. This allows different mobility configuration parameters to be assigned by different entities.

The MCA 420 obtains information of mobility configuration parameters such as available agents providing home agent services from a directory 445 using a service location protocol (SLP). While a home agent is launching a home agent service, it registers to an SLP directory 445. While registering, the home agent provides properties such as the realm of the home agent, network prefix, IP address and the quantity of mobile nodes that the home agent is already binding. For example, home agent 435 can register with the directory 445 offering services as a home agent for mobile entities 405. The realm of the home agent as part of the NAI associated with the mobile entity 405 matches the geographical proximity and is configured during the home agent maintenance along with the network prefix. The IP address of the home agent is received by either the static assignment or using a DHCP service. The mobile entity 405 sends a request message to a MCA 420 with the mobility configuration agent address as the destination address but with the "Home Address" and "Home Agent Address" fields set to zero, all in accordance with standard mobile IP. The mobility configuration agent 420 searches the SLP directory 445 for a registered home agent service suitable to the realm part of the NAI of the mobile entity 405. In one embodiment, if the MCA 420 is able to identify such a service in accordance with the realm part of the NAI of the mobile entity 405, the MCA 420 will extract the appropriate network prefix and IP address, or use the mobility configuration agents 420 own properties to provide services as the AHA to the mobile entity 405. In the event that there is more than one competent home agent with the same realm, the AHA can be chosen based on the number of registered mobile nodes being served by the AHA to enable load balancing. However, those skilled in the art shall appreciate that other parameters such as proximity to the mobile entity can also be used to assign an optimal AHA to the mobile entity and all such parameters are within the scope of the present invention. The mobility configuration agent 420 refers to a DHCP service to receive the leased IP address according to the network prefix. This leased IP address shall be considered as the care-of-address or the assigned home address for the mobile entity 405. The mobility configuration agent 420 re-encapsulates the request message and sends a response message to the mobile entity 405. In one embodiment, the AHA sends the response message to the mobile entity 405 thereby fulfilling the registration request. The response message may comprise information such as the IP address of the AHA and mobile node IP addresses. Other parameters such as any QoS classification, VPN server, etc. may also be part of the response message.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of enabling dynamic configuration of a mobile entity, the method comprising the steps of:
   a mobility configuration agent performs:
   receiving a request message corresponding to the mobile entity;
   determining a mobile router to which the mobile entity belongs;
   determining a first set of mobility configuration parameters corresponding to the mobile router, wherein the first set of mobility configuration parameters comprises a mobile subnet prefix allocated to the mobile router;
   assigning a second set of mobility configuration parameters to the mobile entity based on at least one mobility configuration parameter from the first set;
   sending a response message corresponding to the mobile entity; and
   receiving a request message from a second mobile entity behind the mobile router and assigning to the second mobile entity a home address from the mobile subnet prefix.

2. The method of claim 1, wherein the request and response messages are one of a Mobile Internet Protocol (MIP) registration message, an Internet Key Exchange (IKE) message, an Extensible Authentication Protocol (EAP) message and an Authentication, Authorization and Accounting (AAA) message.

3. The method of claim 1, wherein the request message contains an identifier for the mobile entity.

4. The method of claim 3, wherein the identifier indicates a mobile network sub-domain for the mobile router.

5. The method of claim 1, wherein the second set of mobility configuration parameters comprises at least one of a home agent address, a home Internet Protocol (IP) address and a security association.

6. The method of claim 1, wherein the response message includes at least one mobility configuration parameter from the second set.

7. The method of claim 1, wherein the second set of mobility configuration parameters comprises a home agent address corresponding to an assigned home agent that was selected based on at least one predetermined parameter for the mobile entity.

8. The method of claim 7, wherein the at least one predetermined parameter comprises a mobile network sub-domain for the mobile router.

9. The method of claim 1, wherein the request message includes a registration request generated by the mobile entity that is encapsulated in a Mobile Internet Protocol packet comprising at least an identifier for the mobile entity, and the second set of mobility configuration parameters comprises a home agent address corresponding to an assigned home agent, the method further comprising the steps of:
   de-encapsulating the registration request; and
   re-encapsulating the registration request in a Mobile Internet Protocol packet to generate the response message corresponding to the mobile entity.

10. The method of claim 1 further comprising receiving a request message from the mobile router and assigning to the mobile router the mobile subnet prefix and a home address from the mobile subnet prefix.

11. A method of enabling dynamic configuration of a mobile entity, the method comprising the steps of:
    receiving a request message corresponding to the mobile entity;
    determining a mobile network sub-domain to which the mobile entity belongs;
    determining a first set of mobility configuration parameters corresponding to the mobile network sub-domain;
    assigning a second set of mobility configuration parameters to the mobile entity based on at least one mobility configuration parameter from the first set, wherein the second set of mobility configuration parameters comprises a home agent address corresponding to an assigned home agent that sends a response message corresponding to the mobile entity;
    receiving at least one update from the assigned home agent identifying a status of the response messages; and
    maintaining a mapping between the mobile network sub-domain and the assigned home agent based on the identified status of the response message.

12. The method of claim 11, wherein the first set of mobility configuration parameters comprises a subnet corresponding to the mobile network sub-domain, the mobile entity is a mobile node and the mobile network is supported by a mobile router, the method further comprising the steps of:
    storing the subnet when the mobile entity is powered on before the mobile router is powered on; and
    assigning the subnet to the mobile router when the mobile router is powered on.

13. The method of claim 11, wherein the home agent address is assigned by one of a proxy home agent, a proxy Virtual Private Network (VPN) server and an Authentication, Authorization and Accounting (AAA) server.

14. The method of claim 11, wherein the mobile network sub-domain is determined using at least one identifier for the mobile entity that is included in the request message.

15. A mobility configuration agent comprising:
    a processing device; and
    a memory operatively coupled to the processing device, at least one of the processing device and the memory being adapted for:
    receiving a request message corresponding to a mobile entity;
    determining a mobile router to which the mobile entity belongs;
    determining a first set of mobility configuration parameters corresponding to the mobile router, wherein the first set of mobility configuration parameters comprises a mobile subnet prefix allocated to the mobile router;
    assigning a second set of mobility configuration parameters to the mobile entity based on at least one mobility configuration parameter from the first set;
    sending a response message corresponding to the mobile entity; and receiving a request message from a second mobile entity behind the mobile router and assigning to the second mobile entity a home address from the mobile subnet prefix.

16. The mobility configuration agent of claim 15, wherein the mobility configuration agent is co-located with at least one of a proxy home agent, a proxy Virtual Private Network (VPN) server and an Authentication, Authorization and Accounting (AAA) server.

17. The mobility configuration agent of claim 15, wherein the mobile entity is one of a router and a mobile device.

* * * * *